United States Patent
Todd

(10) Patent No.: US 11,459,848 B2
(45) Date of Patent: Oct. 4, 2022

(54) DEGRADABLE ALIPHATIC POLYESTER FLUID

(71) Applicant: LYONDELLBASELL ADVANCED POYMERS INC., Houston, TX (US)

(72) Inventor: Bradley L. Todd, Duncan, OK (US)

(73) Assignee: LyondellBasell Advanced Polymers Inc., Houston, TX (US)

( * ) Notice: Subject to any disclaimer, the term of this patent is extended or adjusted under 35 U.S.C. 154(b) by 0 days.

(21) Appl. No.: 17/361,855

(22) Filed: Jun. 29, 2021

(65) Prior Publication Data

US 2021/0404287 A1    Dec. 30, 2021

Related U.S. Application Data

(60) Provisional application No. 63/046,333, filed on Jun. 30, 2020.

(51) Int. Cl.
| | | |
|---|---|---|
| *E21B 43/267* | (2006.01) | |
| *E21B 33/13* | (2006.01) | |
| *C08G 63/08* | (2006.01) | |

(52) U.S. Cl.
CPC ............. *E21B 33/13* (2013.01); *C08G 63/08* (2013.01); *E21B 43/267* (2013.01); *E21B 2200/08* (2020.05)

(58) Field of Classification Search
CPC . C09K 8/68; C09K 8/508; C09K 8/80; C09K 8/12; C09K 8/56; E21B 43/16; E21B 2200/08; E21B 33/13; E21B 43/267; E21B 43/26

See application file for complete search history.

(56) References Cited

U.S. PATENT DOCUMENTS

| | | |
|---|---|---|
| 8,329,621 B2 | 12/2012 | Munoz, Jr. et al. |
| 9,890,317 B2 | 2/2018 | Reddy et al. |
| 10,633,580 B2 | 4/2020 | Beuterbaugh et al. |
| 2007/0078063 A1 | 4/2007 | Munoz |
| 2008/0026959 A1 | 1/2008 | Munoz et al. |

FOREIGN PATENT DOCUMENTS

| | | | | |
|---|---|---|---|---|
| CA | 2917394 C | * | 1/2019 | ........... C04B 28/021 |
| WO | WO-2005019599 A1 | * | 3/2005 | ............... C09K 8/12 |

OTHER PUBLICATIONS

International Search Report and Written Opinion dated Oct. 12, 2021 (Oct. 12, 2021) For Corresponding PCT/US2021/039574.

* cited by examiner

*Primary Examiner* — Zakiya W Bates

(57) ABSTRACT

Viscous degradable fluids for use in fluid loss control, diversion, gravel packing, fracturing, and acidizing operations, method of preparing the viscous degradable fluids, and methods of using the viscous degradable fluids in subterranean operations. At least one aliphatic polyester is dissolved in a solvent comprising triacetin to form a viscous degradable fluid. The viscous degradable fluid can be injected directly into a subterranean formation or mixed with other fluids and/or additives before being injected into the subterranean formation, where it can temporarily block or restrict flow through openings in the formation.

10 Claims, No Drawings

DEGRADABLE ALIPHATIC POLYESTER FLUID

PRIOR RELATED APPLICATIONS

This application is the Non-Provisional Patent Applications, which claims benefit of priority to U.S. Provisional Application No. 63/046,333, filed Jun. 30, 2020, the contents of which are incorporated herein by reference in their entirety.

FEDERALLY SPONSORED RESEARCH STATEMENT

Not applicable.

REFERENCE TO MICROFICHE APPENDIX

Not applicable.

FIELD OF THE DISCLOSURE

The disclosure relates to treatment fluids and methods of use in hydrocarbon reservoirs, and more particularly to viscous degradable fluids for use in subterranean operations.

BACKGROUND OF THE DISCLOSURE

Oil and gas companies are challenged to produce as much of their hydrocarbon reserves as possible in a cost-effective manner. As such, the completion and production processes often rely on the use of treatment fluids designed to resolve specific reservoir conditions through the use of one or more additives to increase hydrocarbon production.

The desired flow of the treatment fluid depends on the phase of the hydrocarbon recovery operations. During the producing (or injecting) phase of a well, it is generally desirable to have the subterranean formation as free flowing as possible or at a rate set by the design of the well. In contrast, it may be desirable to allow various fluids to flow into only a portion of the formation or wellbore while preventing flow into other portions during the drilling, completion, or workover phases. Unfortunately, the various treatment fluids may instead flow through vugs, pore spaces, and natural or man-made fractures in the formations, as well as other flow paths such as the wellbore, a well casing, perforation tunnels, slots, tubing, annuli, washouts, particulate packs, void spaces within sand and proppant packs, screens and completion, service, or workover equipment. As a result, the treatment fluids are often lost, reducing the efficiency of the treatment operation.

To overcome fluid loss, particulate material has been employed to bridge/seal/plug certain flow paths in the formations where the flow of fluids is undesirable. However, this material should temporarily block flow paths, such that these flow paths can be re-opened for subsequent operations.

Degradable materials of various types have been employed in subterranean operations for decades to temporarily block flow paths. For example, proppant packs have been created using proppant particulates and degradable materials so that, when the degradable material degrades, voids are formed in the proppant pack. Similarly, the degradable material may be introduced into the formation as part of the fluid that forms the filter cake, such that the filter cake contains the degradable material. Moreover, degradable materials may be used as a coating to temporarily protect openings in a coated object such as a tool until the opening is needed.

Advances have been made in developing degradable materials for blocking undesirable flow paths in reservoirs that also provide additional benefits that reduce the cost and steps in the subterranean operations. Polymer-based solid acid precursor particles, for example, have been added to treatment fluids to temporarily block flow paths, and participate in additional operations as they degrade and generate acid. However, additives such as surfactants are used to prevent the particles from sticking together and viscosifying agents are used enhance placement of the polymer-based solid acid precursor particles. Viscous fluids that comprise water soluble polymers such as guar, xanthan, and cellulose have also been used to overcome fluid loss. However, these materials can be damaging to the formation.

There is a continued need for the development of improved degradable materials that can be used to temporarily block flow paths in subterranean formations as even incremental improvements in technology can mean the difference between cost effective production and reserves that are uneconomical to produce. Preferably, these improved degradable materials can also provide added benefits that reduce the number and concentration of additives, cost and/or steps in the overall treatment operation, without damaging the formation.

SUMMARY OF THE DISCLOSURE

Described herein are viscous degradable fluids that can be used directly in subterranean operations or combined with other additives and treatment fluids for use in a hydrocarbon reservoir, and methods of using treatment fluids containing the viscous degradable fluid.

In one aspect of the present disclosure, at least one aliphatic polyester is dissolved in a solvent to form a viscous degradable fluid. In particular, the viscous degradable fluid is at least one aliphatic polyester dissolved in dimethyl sulfoxide (DMSO), triacetin (1,2,3-triacetoxypropane), a triol such as glycerol, or a diol such as propylene glycol. For example, an aliphatic polyester such as poly(lactic acid) (PLA) can be dissolved in triacetin or DMSO. Other aliphatic polyesters with a glycerol components, such as poly (glycerol adipate), can be dissolved in glycerol or propylene glycol.

In another aspect of the present disclosure, the viscous degradable fluid can be the reaction product of glycerol and a diacid in an excess of glycerol. The glycerol and diacid react to form an aliphatic polyester, and the excess glycerol in the reaction product acts as the solvent that dissolves the polyester. In such a fluid, a separate solvent to dissolve the aliphatic polyester would not be needed; however, one can be added to the reaction product to adjust the viscosity. For example, adipic acid and glycerol can be reacted to form a reaction product that is a viscous degradable fluid having poly(glycerol adipate) dissolved in glycerol. If desired, the viscosity of the reaction product can be reduced by adding propylene glycol.

The viscous degradable fluid can be directly injected into the reservoir or mixed with other fluids, or more solvent, to adjust its viscosity before being directly injected. Alternatively, the viscous degradable fluid can be mixed with additives and/or other treatment fluids and then injected. In some subterranean operations, the viscous degradable fluid is used in place of degradable aliphatic polyester pellets and particles.

Once in the reservoir, the aliphatic polyester(s) in the viscous degradable fluid temporarily blocks or restricts flow through openings in the reservoir. At least 75% and up to 100% of flow can be blocked for a period of time before the viscous degradable fluid degrades. The viscous degradable fluid can enter openings or porous locations in the reservoir rock, which may be naturally occurring (cracks, fractures, and fissures) or man-made such as an annulus between nested pipes or between a wellbore and a pipe (wellbores, perforations, and fractures), and prevent or restrict flow therethrough before degrading.

Alternatively, the viscous degradable fluid can be combined with proppants and injected into the reservoir, wherein the viscous degradable fluid transports the proppants into a fracture. In such an operation, the viscous degradable fluid can also temporarily reduce the permeability of the formation face around or in the fractures.

Regardless of the application, the viscous degradable fluid irreversibly degrades in the formation without leaving any residue or damaging the formation's permeability. In more detail, the aliphatic polyester(s) dissolved in the degradable fluid are hydrolyzed into one or more degradation products, thus unblocking the flow paths. In some embodiments, additional fluids may be injected to selectively hydrolyze and degrade the aliphatic polyester(s) into one or more degradation products. The hydrolysis degradation products are unable to recrystallize or consolidate downhole, preventing them from damaging the formation's permeability The present compositions and methods include any of the following embodiments in any combination(s) of one or more thereof:

A degradable fluid for use in hydrocarbon reservoirs, comprising at least one aliphatic polyester dissolved in a solvent.

A degradable fluid comprising at least one aliphatic polyester dissolved in triol or diol.

A degradable fluid comprising at least one aliphatic polyester dissolved in triacetin, propylene glycol, DMSO, or glycerol.

A degradable fluid comprising the reaction produce of a diacid in excess glycerol.

A treatment fluid for treating a reservoir having a viscous degradable fluid comprising at least one aliphatic polyester dissolved in triacetin, propylene glycol, DMSO, or glycerol, and at least one additive.

Any of the degradable fluids described here, wherein the viscosity of the degradable fluid is from about 20 cP to about 300 cP.

Any of the degradable fluids described here, wherein the at least one aliphatic polyester is selected from a group including poly(lactic acid) (PLA), polyglycolide (PGA), poly(ε-caprolactone) (PCL), poly(γ-valerolactone) (PVL), polyhydroxyalkanoate (PHA), polyhydroxybutyrate (PHB), poly(glycerol adipate), and copolymers thereof.

Any of the degradable fluids described here, wherein the degradable fluid is formed by the reaction of a di-acid in excess glycerol.

Any of the degradable fluids described here, wherein the degradable fluid is formed by the reaction of adipic acid in excess glycerol.

Any of the degradable fluids described here, wherein the at least one aliphatic polyester is poly(lactic acid) (PLA).

Any of the degradable fluids described here, wherein the at least one aliphatic polyester is poly(L-lactic acid) (PLLA).

Any of the degradable fluids described here, wherein the at least one aliphatic polyester is poly-DL-lactic acid (PDLLA).

Any of the degradable fluids described here, wherein the at least one aliphatic polyester is poly(glycerol adipate).

Any of the degradable fluids described here, wherein the at least one aliphatic polyester is poly(lactic acid) (PLA) and the solvent is triacetin or DMSO.

Any of the degradable fluids described here, wherein the at least one aliphatic polyester is poly(glycerol adipate) and the solvent is propylene glycol or glycerol.

Any of the degradable fluids described here, wherein the at least one aliphatic polyester is present in an amount of about 1 wt. % to about 90 wt. % of the degradable fluid.

Any of the treatment fluids described here, wherein the at least one additive is a carrier fluid.

Any of the treatment fluids described here, wherein the at least one additive is selected from a group comprising salts, pH control additives, surfactants, breakers, biocides, crosslinkers, additional fluid loss control agents, stabilizers, chelating agents, scale inhibitors, mutual solvents, aqueous solution, particulates, proppants, corrosion inhibitors, oxidizers, reducers, friction reducer, and any combination thereof.

Any of the treatment fluids described here, wherein the at least one additive is an aqueous solution and one or more proppants.

Any of the treatment fluids described here, wherein the at least one additive is an aqueous solution and one or more proppants, and the at least one aliphatic polyester is poly(lactic acid) (PLA).

Any of the treatment fluids described here, wherein the at least one additive is an aqueous solution and one or more proppants, and the at least one aliphatic polyester is poly(glycerol adipate).

A method of using any of the treatment fluids described here, comprising injecting the treatment fluid having a degradable fluid comprising at least one aliphatic polyester dissolved in a solvent selected from a group consisting of triacetin, propylene glycol, DMSO, and glycerol and, at least one additive, into a subterranean formation; filling at least one opening in the subterranean formation with the treatment fluid; blocking flow into the at least one opening with the at least one aliphatic polyester in the degradable fluid for a period of time; degrading the degradable fluid and unblocking the at least one opening; and, flowing a fluid through the at least one opening. The blocking step can restrict at last 75% of flow, up to at least 100% of flow. Alternatively, the method can further include the step of injecting an aqueous fluid to selectively degrade the degradable fluid. In yet another alternative, the method can include the step of injecting a second treatment fluid after the blocking step and before the degrading step. Alternatively, the method can include the step of alternating the injection of a second treatment fluid with more injections of the treatment fluid after the blocking step and before the degrading step. The second treatment fluid can include a carrier fluid and at least one additive selected from a group comprising salts, pH control additives, surfactants, breakers, biocides, crosslinkers, additional fluid loss control agents, stabilizers, chelating agents, scale inhibitors, gases, mutual solvents, particulates, proppants, corrosion inhibitors, oxidizers, reducers, friction reducer, and any combination thereof.

A method of using any of the treatment fluids described here, comprising injecting the treatment fluid having a degradable fluid comprising at least one aliphatic polyester dissolved in a solvent selected from a group consisting of triacetin, propylene glycol, DMSO, and glycerol and, at least one additive, into a subterranean formation; filling at least one opening in the subterranean formation with the treatment fluid; blocking flow into the at least one opening with the at least one aliphatic polyester in the degradable fluid for a period of time; performing at least one downhole operation; degrading the degradable fluid and unblocking the at least one opening; and, flowing a fluid through the at least one opening. In some embodiments, the at least one downhole operation is chosen from a group including, but not limited to, moving a tool; perforating, setting and/or retrieving a packer or plug; setting a screen or liner; setting a whipstock; sliding a sleeve; plugging or opening a port; installing, removing or adjusting artificial lift equipment or chemical injection equipment; cementing; milling; logging; coring; performing a wireline operation; performing a tubing operation; performing a casing operation; activating a valve; performing a "fishing" operation; performing a workover operation; performing a coiled tubing or snubbing operation; performing a drilling operation; performing a sand control operation; performing a completion operation; performing a production operation; and, combination thereof.

A method of fracturing a subterranean formation that includes the steps of injecting a degradable fluid comprising at least one aliphatic polyester dissolved in a solvent selected from a group consisting of triacetin, propylene glycol, DMSO, and glycerol, into a subterranean formation; blocking flow into one or more openings in the subterranean formation with the at least one aliphatic polyester in the degradable fluid for a period of time; injecting the degradable fluid under pressure into the subterranean formation; forming at least one fracture in the subterranean formation; subsequently injecting additional degradable fluid under pressure into the subterranean formation to increase the length and width of the at least one fracture to a predetermined size, wherein the additional degradable fluid does not enter the one or more openings in the subterranean formation; injecting a treatment fluid into the subterranean formation, wherein the treatment fluid comprises the degradable fluid and proppants; placing the proppants in the at least one fracture to prop open the fracture; degrading the degradable fluid in the one or more openings and at least one fracture; and, flowing a fluid through the one or more openings and at least one propped fracture.

Any of the methods described herein, wherein the step of blocking flow lasts for at least 3 days at a subterranean formation temperature of about 120° F. (~49° C.) to about 140 (60° C.).

Any of the methods described herein, wherein the step of blocking flow lasts for at least 3 days at a subterranean formation temperature of about 130° F. (~54° C.).

Any of the methods described herein, wherein the step of blocking flow lasts for at least 1 day at a subterranean formation temperature between about 180° F. (~82° C.) to about 200° F. (~94° C.).

Any of the methods described herein, wherein the step of blocking flow restricts at least 75% and up to 100% of flow through the opening(s) being blocked.

Any of the methods described herein, wherein the step of degrading the degradable fluid comprises injecting an aqueous fluid to selectively degrade the degradable fluid.

This summary is provided to introduce a selection of concepts that are further described below in the detailed description. This summary is not intended to identify key or essential features of the claimed subject matter, nor is it intended to be used as an aid in limiting the scope of the claimed subject matter.

Definitions

As used herein, the term "degradable" refers to a transition, naturally or induced, of an initial chemical composition to a second chemical composition. This transition can be the result of chemical reactions, thermal reactions, or a combination of both. The second chemical composition that results from the initial chemical composition may be referred to as the "degradation" products. For example, poly(lactic acid) may degrade to include at least one degradation product. In some examples, the poly(lactic acid) may chemically degrade via a hydrolysis reaction into at least one degradation product. In some examples, the degradation product of poly(lactic acid) contains at least 1 wt. % of lactic acid. In some examples, the degradation product contains from about 1 wt. % to about 100 wt. % lactic acid and other degradation products.

As used herein, the term "irreversible" in reference to degradation means that the degradable material, once degraded, do not recrystallize or reconsolidate downhole.

As used herein, the term "treatment," or "treating," is intended to refer to any wellbore or subterranean operation that uses a fluid in conjunction with a desired function and/or for a desired purpose. The term "treatment," or "treating," is not intended to imply any particular action by the fluid or its components. Exemplary treatment fluids include, but are not limited to acidizing fluids, fracturing fluids, gravel packing fluids, drilling or milling fluids, lost circulation fluids, solvent fluids, chemical stimulation fluids, workover fluids, completion fluids, injection fluids, cleanout fluids, perforating fluids and kill fluids.

As used herein, the term "fluid loss" refers to the undesirable migration or loss of fluids and/or slurry into a subterranean formation and/or a void space within the proppant pack.

The terms "hydraulic fracturing" and "fracturing" are used interchangeably to refer to a well stimulation technique in which rock is fractured by a pressurized treatment fluid called a "fracturing fluid". When the hydraulic pressure is removed from the well, small grains of hydraulic fracturing proppants (for example sand or aluminum oxide) hold the fractures open. The fracturing pressure of the treatment fluid is extremely high, up to 15,000 pounds per square inch, while the injection rate can be about 265 liters per second.

The term "acid treatment" is used to refer to a well stimulation technique in which acid treatment fluids are injected into a reservoir to dissolve reservoir rock or sediments, mud solids, and/or other soluble damage between the sediment grains of the reservoir rocks or flow paths. This treatment allows for the restoration of the natural productivity of the reservoir rock.

As used herein, the term "blocking" refers to the restriction of flow through at least one opening. For example, the poly(lactic acid) used in some embodiments of the presently disclosed fluids can fill the opening and restrict flow therethrough. In some examples, the poly(lactic acid) fills up and temporarily restricts at least 75% of the flow and up to about 100% of the flow through an opening.

The term "carrier fluid" is used to refer to a fluid that transports materials into or out of the wellbore.

As used herein, the term "derivative" refers to a compound that is derived from a similar compound by a chemical reaction. The derived compound can be made by, for example, replacing one atom in the similar compound with another atom or group of atoms, rearranging two or more atoms in the similar compound, ionizing the similar compound, or creating a salt of the similar compound.

As used herein, the term "aliphatic" in reference to hydrocarbons chains or compounds means that atoms in the chains or compounds are connected by single, double, or triple bonds to form non-aromatic structures. The aliphatic chains can be straight, branched, or in rings.

As used herein, the term "polyester" refers to a category of polymers that contain the ester (—OOR—) functional group in every repeat unit in their main chain.

All concentrations herein are by weight percent ("wt. %") unless otherwise specified.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| BHT | Bottom hole temperature |
| DMSO | Dimethyl sulfoxide |
| PCL | poly(ε-caprolactone) |
| PDLLA | Poly-DL-lactic acid |
| PGA | polyglycolide |
| PHA | polyhydroxyalkanoate |
| PHB | polyhydroxybutyrate |
| PLA | poly(lactic acid) |
| PLLA | poly(L-lactic acid) |
| ppg | Pounds per gallon |
| PVL | poly(γ-valerolactone) |

DESCRIPTION OF EMBODIMENTS OF THE DISCLOSURE

The present disclosure provides novel viscous degradable fluids for use in treatment operations for hydrocarbon reservoirs. In particular, at least one aliphatic polyester is solubilized in a solvent such as a triol, a diol, DMSO, or triacetin (1,2,3-triacetoxypropane) to form a viscous and degradable fluid. Alternatively, the degradable fluid can be the viscous reaction product of a diacid in excess glycerol. This viscous degradable fluid can be injected directly into a formation as part of a subterranean operation, or combined with treatment fluids, proppants or other additives before being introduced into a formation. Methods of forming the viscous degradable fluids, and methods of using the viscous degradable fluids in other treatment fluids are also described.

Water-soluble polymeric pellets and particles, including those made from aliphatic polyesters, have been used as treatment fluid additives in many subterranean operations including stimulation, fluid loss control, lost circulation, diversion, and plugging operations. These polymeric particles come in a variety of shapes and sizes, allowing them to be modified or combined for the specific application such as use in fracturing fluids, acidizing fluids, drilling fluids, fluid loss control components, diverting agents, filter cake components, and cement additives. However, additional surfactants and polymers are added to the carrier fluid to decrease viscous losses during placement of the water-soluble polymer pellets in the well or to prevent the water-soluble polymer pellets from sticking together or to surfaces, or to enhance polymer placement in other ways.

The present disclosure provides a degradable composition that can be used in place of water-soluble polymeric pellets and particles in treatment fluids, can be used as a carrier fluid for carrying and placing proppants, or can be used alone for direct injection into subterranean formations. This reduces costs associated with additional chemicals and/or equipment that aid in placing the polymeric pellets and particles.

In more detail, the degradable composition is a viscous fluid formed by solubilizing at least one aliphatic polyester polymer in a solvent such as a triol (glycerol), a diol (propylene glycol), DMSO, or triacetin. Aliphatic polyesters are water soluble polymers that degrade chemically by hydrolytic cleavage. Examples of hydrolytically degradable aliphatic polyesters that may be used include, but are not limited to, those described in the publication of Advances in Polymer Science, Vol. 157 entitled "Degradable Aliphatic Polyesters" edited by A. C. Albertsson. Other hydrolytically degradable aliphatic polyesters can be those made by polycondensation reactions, ring-opening polymerizations, free radical polymerizations, anionic polymerizations, carbocationic polymerizations, or coordinative ring-opening polymerization.

In some embodiments, aliphatic polyesters for use in the present compositions may have the general formula of repeating units shown in Formula 1.

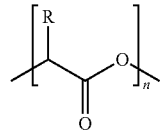

FORMULA 1 where n is an integer above 75, or between 75 and 10,000, and R is selected from the group consisting of hydrogen, alkyl, aryl, alkylaryl, acetyl, heteroatoms, and mixtures thereof. Alternatively, the aliphatic polyesters are homopolymers, random, block, graft, and star- and hyper-branched aliphatic polyesters. In yet another alternative, the aliphatic polyesters may be prepared by known manufacturing methods, including those described in U.S. Pat. Nos. 6,323,307; 5,216,050; 4,387,769; 3,912,692; and 2,703,316.

Examples of aliphatic polyester polymers for use in the present compositions include, but are not limited to poly (lactic acid) (PLA), also called poly(lactide), polyglycolide (PGA), poly(ε-caprolactone) (PCL), poly(γ-valerolactone) (PVL), polyhydroxyalkanoate (PHA), polyhydroxybutyrate (PHB), poly (glycerol adipate), and copolymers thereof. In some embodiments, the aliphatic polyester is PLA. PLA is synthesized either from lactic acid by a condensation reaction or more commonly by ring-opening polymerization of cyclic lactide monomer. Since both lactic acid and lactide can achieve the same repeating unit, the general term poly(lactic acid) as used herein refers to esters without any limitation as to how the polymer was made such as from lactides, lactic acid, or oligomers, and without reference to the degree of polymerization. In other embodiments, the aliphatic polyester is poly (glycerol adipate), which is formed by the reaction of adipic acid and glycerol. Glycerol is a viscous fluid that is readily available because it is a byproduct in waste streams for many bioreactor operations. The glycerol can be obtained from such sources and used not only as a component in the aliphatic polyester but also as a solvent to dissolve the aliphatic polyester and form the degradable viscous fluid.

Plasticizers may be present in the aliphatic polyesters to provide desired characteristics for improved manufacturing of the solid material, for example, more effective compatibilization of the melt blend components or improved processing characteristics during the blending and processing steps. Examples of plasticizers include, but are not limited to, polyethylene glycol; polyethylene oxide; bis(butyl diethylene glycol)adipate; ethylphthalylethyl glycolate; glycerin diacetate monocaprylate; diacetyl monoacyl glycerol; polypropylene glycol (and epoxy derivatives thereof); poly(propylene glycol)dibenzoate, dipropylene glycol dibenzoate; glycerol; ethyl phthalyl ethyl glycolate; poly(ethylene adipate) distearate; di-iso-butyl adipate; and combinations thereof. However, these plasticizes are not expected to affect the performance of the aliphatic polyesters or the viscosity of the degradable fluid.

The aliphatic polyester(s) affect the performance and degradation of the degradable fluid. Different aliphatic polyesters can be combined and dissolved in the solvent to enhance blocking of flow through certain formation openings, to control the degradation of the fluid, or to obtain a certain viscosity for carrying proppants into the formation. In some embodiments, the novel viscous degradable fluid includes aliphatic polyesters with the same base polymer, but different molecular weights, crystallinity, and/or stereoisomers. Alternatively, aliphatic polyesters with different base polymers, and the same or different molecular weights, crystallinity, and/or stereoisomers can be used in the viscous degradable fluid.

The spatial arrangement of the aliphatic polyester, its crystallinity, and its molecular weight can be selected to control the degradation rate for different reservoir conditions. Aliphatic polyesters with lower molecular weight are usually amorphous polymers and will be suitable for lower temperature formations, whereas higher molecular weight aliphatic polymers are more crystalline polymers and suitable for higher temperature formations. Chirality may also be selected to adjust the degradable rate. The lactide monomer in PLA, for example, exists in three different forms: two stereoisomers L- and D-lactide and racemic D,L-lactide (meso-lactide). The chirality of the lactide units provides a means to adjust degradation rates. PLA formed with L-lactide isomers is poly(L-lactic acid) (PLLA) and is a semi-crystalline polymer with a relatively slow hydrolysis rate. Thus, it can be used in applications that need a slower degradation of the viscous degradable fluid. In contrast, PLA with racemic mixtures of the D- and L-lactides is poly-DL-lactic acid (PDLLA) and is a more amorphous polymer with a faster hydrolysis rate and may be suitable for applications where a more rapid degradation may be appropriate.

The stereoisomers, crystallinity, and/or molecular weights of the chosen degradable aliphatic polymer may be used individually or combined with other aliphatic polymers having similar or different properties in the chosen solvent. Alternatively, the chosen aliphatic polyesters can be combined with other stereoisomers of other degradable polymers by blending, copolymerizing or otherwise mixing the polymers. Additionally, the chosen degradable polymer may be copolymerized with monomers such glycolide, ε-caprolactone, 1,5-dioxepan-2-one, or trimethylene carbonate to produce a polyester with different properties or degradation times that is still suitable for the viscous degradable fluid.

In some embodiments, the degradation of the degradable fluid can be controlled for about 3 to 5 days at formation temperatures or bottom hole temperatures (BHT) of about 120° F. (~49° C.) to about 140 (60° C.), or about 130° F. (~54° C.). For these temperatures and time period, almost 100%, if not all, of the aliphatic polyester(s), and thus degradable fluids, has been hydrolyzed and degraded. In some embodiments, at least 100% of flow through an opening can be blocked or restricted for at least one day, at least two days, or at least three days at these temperatures.

At higher formation temperatures of about 180-200° F. (~82-94° C.), the degradation can be controlled for about 1 to 2 days until almost 100%, if not all, of the aliphatic polyester(s) are hydrolyzed. Several hours of controlled degradation can be obtained at formation temperatures of about 300° F. (148° C.).

The rate of hydrolysis can also be modified by the addition of components such as acids, bases, enzymes, or metal salts that can catalyze the degradation of the aliphatic polyesters in the formation. Thus, additional fluids that utilize one of these components can be used to selectively degrade the degradable fluids at a specific time, or to degrade any remaining aliphatic polyester(s) and degradable fluids remaining after flow has resumed through the previously blocked or restricted opening(s).

To form the degradable fluid, the chosen aliphatic polyester(s) is/are dissolved in a solvent such as a triol, a diol, DMSO or triacetin. Examples of triols that can be used include, but are not limited to, glycerol and butanetriol. Examples of diols that can be used include, but are not limited to, ethylene glycol, propylene glycol, and butanediol.

The amount of aliphatic polyesters in the solvent will depend on the use of the viscous degradable fluid. In some embodiments, the aliphatic polyesters may be present in an amount from about 1 to about 90 wt. % of the viscous degradable fluid; alternatively, the aliphatic polyesters may be present in an amount from about 1 to about 30 wt. % of the viscous degradable fluid; alternatively, the aliphatic polyesters may be present in an amount from about 20 to about 50 wt. % of the viscous degradable fluid; alternatively, the aliphatic polyesters may be present in an amount from about 40 to about 80 wt. % of the viscous degradable fluid; alternatively, the aliphatic polyesters may be present in an amount from about 60 to about 90 wt. % of the viscous degradable fluid; alternatively, about 15 to about 30 wt. % of the viscous degradable fluid.

Aliphatic polyesters readily solubilize in triols, diols, DMSO, and/or triacetin. These components can be mixed using a static mixer, a blender, or any other type of mixing device which introduces sufficient mixing energy into the mixture to solubilize the polyester in the chosen solvent.

Alternatively, the viscous degradable fluid can be the reaction product of a diacid in an excess of glycerol. The glycerol not only reacts with the diacid to form the polyester, but it also acts as a solvent to dissolve the polyester, forming a viscous, degradable reaction product. The reaction product can be used as-is or another solvent such as a diol can be used to modify the viscosity of the reaction product. In some embodiments, propylene glycol is added to the reaction product to modify its viscosity.

The viscosity of the presently described viscous degradable fluids is between about 1 cP to several thousands of cP, up to about 10,000 cP. In some embodiments, an aqueous fluid or brine may be added to the viscous degradable fluid to adjust the viscosity of the viscous degradable fluid for specific operations and/or to conform to pumping equipment requirements. In some embodiments, the viscous degradable fluid will have a viscosity of at least 20 cP to act as a carrier fluid for proppants or other additives. However, less viscous fluids are still readily useable in subterranean operations.

The novel viscous degradable fluid can be used in any subterranean formation well treatment application that requires temporary blocking or restriction of flow through openings in the formation. The methods disclosed herein use the novel viscous degradable fluid directly for a variety of subterranean treatment operations including stimulation, fracturing, acidizing, fluid loss control, lost circulation, diversion. In other embodiments, proppants are added to the viscous degradable fluid, which then acts as a carrier fluid to place the proppants in the reservoir.

Alternatively, the viscous degradable fluid can be added to many different types of treatment fluids. In some embodiments, these novel treatment fluid compositions comprise a carrier fluid and the viscous degradable fluid, as well as other optional additives or proppants used in subterranean operations. For any of the fluids or methods described herein that utilize a carrier fluid separate from the viscous degradable fluid, the carrier fluid may be aqueous, non-aqueous, foamed, or an emulsion. This includes, but is not limited to, fresh water, salt water, brine (saturated salt water), seawater, produced water (subterranean formation water brought to the surface), surface water (such as lake or river water), and flow back water (water placed into a subterranean reservoir and then brought back to the surface). In some embodiments, the carrier fluid is selected from a group comprising fresh water, salt water, brine, and seawater. In other embodiments, the carrier fluid is brine. In yet other embodiments, the carrier fluid is used to adjust the viscosity of the viscous degradable fluid.

The viscous degradable fluid may also replace particulate aliphatic polyesters in any treatment fluid/operation, including acidizing fluids, fluid loss control agents, diverting agents, filter cake components, drilling fluid, and cement fluids.

The viscous aliphatic polyester fluid may also be injected as a "pill" to provide fluid loss control or fluid diversion. The degradable fluid pill can be introduced into the treatment fluid at the surface and pumped down the well to contact a portion of the face of the formation that is experiencing fluid loss. The face may be a surface of the well bore or it may be a surface of a created fracture extending from the well into the subterranean formation. The viscous aliphatic polyester fluid will flow into the most permeable portion or portions of the formation face upon contact therewith and thereby divert the flow of subsequent treatment fluid to other portions of the subterranean formation. Alternatively, the degradable fluid pill can be directly injected into the reservoir first, followed by subsequent injections of treatment fluids that need to be diverted. In yet another alternative, injections of the degradable fluid can be alternated with injections of a second treatment fluid that needs to be diverted.

The viscous aliphatic polyester-containing fluid may also be injected into a reservoir before the performance of a downhole operation. The degradable fluid can be injected into the well or reservoir, to contact openings in formation that are experiencing fluid loss. After blocking at least 75% and up to 100% of the flow through these openings, one or more downhole operations can be performed, including, but not limited to, moving a tool; perforating, setting and/or retrieving a packer or plug; setting a screen or liner; setting a whipstock; sliding a sleeve; plugging or opening a port; installing, removing or adjusting artificial lift equipment or chemical injection equipment; cementing; milling; logging; coring; performing a wireline operation; performing a tubing operation; performing a casing operation; activating a valve; performing a "fishing" operation; performing a workover operation; performing a coiled tubing or snubbing operation; performing a drilling operation; performing a sand control operation; performing a completion operation; performing a production operation; and, combination thereof.

The viscous degradable fluid can also be used in all stages of a fracturing, gravel packing, or "frac-packing" operation, including as prepad or pad fluid. Hydraulic fracturing is used around a wellbore to increase fluid productivity or injectivity of the well. During fracturing operations, fluids are injected into a formation at an injection rate such that the pressure of the fluid at the formation is higher than the earth stress in the formation. This causes a crack or fracture to develop in the face of the rock at the wellbore. Continued fluid injection into the well then causes the fracture to increase in length and width. After a sufficient width is achieved by continued fluid injection, proppants are added to the fluid. The fluid injected up until the time proppant is added is called "pad" fluid. After the proppant-containing fluid injection has ceased, fracturing fluid flows out of the fracture, allowing the walls of the fracture to close on the proppant. The proppant particles then prop the walls of the fracture apart. Since the proppant particles are normally much larger than the particles of the formation, the fluid permeability of the propped fracture is much greater than that of the formation; hence, the flow capacity of the well is increased.

The viscous degradable fluid can be injected directly into the reservoir that is to be fractured as a pre-pad fluid to control fluid loss through openings in the formation. The viscous aliphatic polyesters in the viscous degradable fluid reduce the permeability of the formation by filling the openings and temporarily blocking flow through the openings. This allows for subsequent injections of pad fluids to flow into the formed fracture to increase the fractures length and width.

Alternatively, the viscous degradable fluid can be injected directly into the reservoir as the pad fluid, or combine to a separate pad fluid for injection. As with the pre-pad fluid applications, the viscous degradable fluid reduces the permeability of the fracture face and controls fluid loss. This allows the treatment fluid to penetrate deeper into the formation to extend the fracture a greater distance without the introduction of larger volumes of treatment fluid. By limiting the volume of treatment fluid needed to form suitable fractures, there is less potential formation damage caused by the treatment fluid. The viscous degradable aliphatic polyester fluid will then degrade in the formation fluids.

Once the fractures are large enough to accept proppants, proppants can be added to the viscous degradable fluid for injection into the reservoir. The viscous degradable fluid will carry the proppants and placed them in the fractures.

Hydraulic fracturing has been used with gravel packing of wells in a process often called frac-packing. The formations in which this process is applied have high permeability, and the fracture is formed only to bypass permeability damage near a wellbore. A short fracture could bypass damage in wells that require sand control using gravel packing. Conventional fracturing fluids, such as those containing a soluble gelling polymer, can damaged the permeability of the longer fractures formed with conventional fluids when gravel packing. The present viscous degradable fluid, however, can be used to form the short fractures without damaging the permeability of the reservoir, and also temporarily restrict fluid flow through the highly permeable formation.

In some applications of the presently described viscous degradable fluid, additional additives can be combined with the viscous degradable fluid to aid in controlling fluid loss, diversion, or plugging. Alternatively, the additional additives are directed to other uses besides controlling fluid loss, diversion, gravel packing, fracturing, and acidizing. As such, the treatment fluids can further comprise optional additive including, but not limited to salts, pH control additives, surfactants, breakers, biocides, additional fluid loss control agents, stabilizers, chelating agents, scale inhibitors, mutual solvents, particulates, corrosion inhibitors, oxidizers, reducers, and any combination thereof.

Particulates. The degradable fluid described herein, or fluids incorporating this solution, may further comprise additional optional particulates, including proppant particulates or gravel particulates. Such particulates may be included in the treatment fluids when a gravel pack is to be formed in at least a portion of the well bore, or a proppant pack is to be formed in one or more fractures in the subterranean formation.

Particulates suitable for use in the presently described treatment fluids and methods may comprise any material suitable for use in subterranean operations, including but not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, calcium silicate, kaolin, talc, zirconia, boron, fly ash, hollow glass microspheres, solid glass, and combinations thereof.

The additional particulates described here are not limited to a particular shape. All known shapes of materials, including substantially spherical materials, fibrous materials, polygonal materials (such as cubic materials), and mixtures thereof can be used according to the application. For example, fibrous materials may or may not be used to bear the pressure of a closed fracture during a fracturing operation, but could be included in the fluid loss control operations. In some embodiments, the particulates may be coated with any suitable resin or tackifying agent known to those of ordinary skill in the art.

The mean particulate size for these additional particulates generally may range from about 2 mesh to about 400 mesh on the U.S. Sieve Series Scale. However, in certain circumstances, other mean particulate sizes may be desired and will be entirely suitable for practice of the presently described methods. In some embodiments, the mean particulate size distribution ranges are one or more of 6/12, 8/16, 12/20, 16/30, 20/40, 30/50, 40/60, 40/70, 50/70, or 70/140 mesh, or down to smaller sizes of 200 mesh and 10's of microns. The additional particulates may be present in the treatment fluids of the present disclosure in an amount in the range of from about 0.5 pounds per gallon (ppg) to about 30 ppg by volume of the treatment fluid.

pH Control. A pH control additive may be necessary to maintain the pH of the degradable fluid-containing treatment fluid at a desired level to, for example, improve the effectiveness of certain breakers or crosslinkers, or aid in degradation control. Examples of suitable pH control additives that may optionally be added to the treatment fluids of the present disclosure are bases and/or acid compositions. One of ordinary skill in the art will be able to recognize a suitable pH for a particular application.

Surfactants. In some embodiments, the treatment fluids of the present disclosure may include optional surfactants to improve the compatibility of the treatment fluids with other fluids (like any formation fluids) that may be present in the wellbore. One of ordinary skill in the art will be able to identify the type of surfactant as well as the appropriate concentration of surfactant to be used.

Suitable surfactants may be used in a liquid or powder form. Where used, the surfactants may be present in the treatment fluid in an amount sufficient to prevent incompatibility with formation fluids, other treatment fluids, or well bore fluids. In an embodiment where liquid surfactants are used, the surfactants are generally present in an amount in the range of from about 0.01% to about 5.0% by volume of the treatment fluid. In other embodiments, the liquid surfactants are present in an amount in the range of from about 0.1% to about 2.0% by volume of the treatment fluid. In embodiments where powdered surfactants are used, the surfactants may be present in an amount in the range of from about 0.001% to about 0.5% by weight of the treatment fluid.

Breakers. As mentioned above, the acid generated with the degradation of the presently disclosed viscous aliphatic polymer fluid can be used to break gels. However, additional breakers may be added to the treatment fluids described herein.

Examples of breakers for use in the described treatment fluids include, but are not limited to, sodium chlorites, hypochlorites, perborate, persulfates, and peroxides (including organic peroxides). Other breakers include, but are not limited to, suitable acids and peroxide breakers, delinkers, as well as enzymes that may be effective in breaking viscosified treatment fluids. In some embodiments, the breaker may be citric acid, tetrasodium EDTA, ammonium persulfate, or cellulose enzymes.

A breaker may be included in an amount and form sufficient to achieve the desired results at a desired time. The breaker may be formulated to provide a delayed break or may be encapsulated. Suitable encapsulation methods are known to those skilled in the art. Exemplary encapsulation methods involves coating the selected breaker in a porous material that allows for release of the breaker at a controlled rate, or coating the chosen breakers with a material that will degrade when downhole so as to release the breaker when desired. Resins that may be suitable include, but are not limited to, polymeric materials that will degrade when downhole.

Alternatively, the breakers may be encapsulated by synthetic and natural waxes. Waxes having different melting points may be used in order to control the delay of breaking based on the temperature of a specific subterranean operation. The encapsulation of the breaker is performed by mixing the breaker and wax above the melting temperature for the specific wax and then extruding the composition to form small particles of the encapsulated material. The resulting product may be annealed by briefly heating the product to the point of the coating to seal cracks in the coating, thus preventing premature release. The encapsulation may also be achieved by melt spraying the wax on the breaker particles or by any other technique known by a one of ordinary skill in the art. If used, a breaker should be included in a treatment fluid of the present invention in an amount sufficient to facilitate the desired reduction in viscosity in a treatment fluid. For instance, peroxide concentrations that may be used vary from about 0.1 to about 30 gallons of peroxide per 1000 gallons of the treatment fluid. Similarly, for instance, when citric acid is used as a breaker, concentrations of from 0.11 pounds per thousand gallons (pptg) (~0.013 kg/m$^3$) to 30 pptg (3.59 kg/m$^3$) are appropriate.

An optional activator or retarder to can be used to, among other things, optimize the break rate provided by a breaker. Any known activator or retarder that is compatible with the selected breaker can be used in the present treatment fluids. Examples of activators include, but are not limited to, acid generating materials, chelated iron, copper, cobalt, and reducing sugars. Examples of retarders include sodium thiosulfate, methanol, and diethylenetriamine. One of ordinary skill will be able to identify a suitable activator or retarder for use with the selected breaker, and the proper concentration of such activator or retarder for a given application.

In some embodiments, the retarder or activator may be used in a range of from about 1 to about 100 pptg (~0.12 to about ~12 kg/m$^3$) of treatment fluid or from about 5 pptg (~0.60 kg/m$^3$) to about 20 pptg (~2.4 kg/m$^3$).

These are a few of the additives that can be used with the presently described degradable fluid. One of ordinary skill will be able to identify suitable additives and proper concentrations thereof to be added to the degradable fluid or added to a treatment fluid containing the degradable fluid, for a given application. Further, adjustments to the viscosity of the degradable fluid to make it amenable to a variety of subterranean operations is also within the purview of one with ordinary skill.

The following example is included to demonstrate the ability of the above described compositions to form a viscous fluid that can support a proppant material at reservoir temperatures. The example is intended to be illustrative, and not unduly limit the scope of the appended claims. Those of skill in the art should appreciate that many changes can be made in the specific embodiments which are disclosed herein and still obtain a like or similar result without departing from the spirit and scope of the disclosure herein. In no way should the following be read to limit, or to define, the scope of the appended claims.

Example

The viscosity of a degradable fluid formed by dissolving an aliphatic polyester in triacetin was measured under various temperatures. The aliphatic polyester was amorphous PLA particles with a particle size between about 2350 to about 3350 microns (⅝ mesh on the U.S. Sieve Series Scale). Different weight percentages of the PLA were dissolved into triacetin to form a degradable fluid.

Each degradable fluid was then heated to a known temperature before having the viscosity measured using a Fann Model 35 viscometer equipped with a B-1 bob. The viscosity measurements were record at 511 seconds and at 300 RPMs. The results are shown in Table 1.

TABLE 1

| Viscosity of PLA dissolved in Triacetin | | |
| --- | --- | --- |
| Amount of PLA (wt. %) | Viscosity (cP) | Temperature (° F.) |
| 0 | 20 | 70.4 |
| 1 | 25 | 70.9 |

TABLE 1-continued

| Viscosity of PLA dissolved in Triacetin | | |
| --- | --- | --- |
| Amount of PLA (wt. %) | Viscosity (cP) | Temperature (° F.) |
| 2 | 30 | 71.2 |
| 3 | 35 | 72 |
| 5 | 49 | 73.2 |
| 10 | 105 | 73.8 |
| 15 | 204 | 74.3 |
| 20 | >300 | 71.1 |
| 20 | 250 | 80 |
| 20 | 215 | 85 |
| 20 | 175 | 90 |
| 20 | 150 | 95 |
| 20 | 130 | 100 |
| 20 | 115 | 106 |
| 20 | 100 | 110 |
| 20 | 85 | 116 |
| 20 | 76 | 120 |
| 20 | 71 | 124 |
| 20 | 58 | 130 |
| 20 | 53 | 140 |
| 20 | 47 | 150 |

The results show that the described fluids are viscous. In most subterranean operations, the PLA/triacetin fluids are viscous enough to divert subsequently introduced fluids which are likely to have a lower viscosity. Further, the fluids with 20 wt. % PLA are viscous enough, even at elevated temperatures above 100° F. (~37.7° C.), to support a proppant material. Similar results are expected with other aliphatic polyester/solvent combinations such as poly(glycerol adipate) and propylene glycol.

Thus, the described fluids can be used to transport proppant material into a fracture during a fracturing or gravel packing operation, as well as other solid pellet or particular material used for other operations. The viscous degradable solvent can then also temporarily block flow through openings in the formation to divert fluids or provide fluid loss control. This versatility allows the viscous fluids to be used for a variety of operations downhole, including gravel packing, fracturing, acidizing, fluid loss control, and diversion.

The following references are incorporated by reference in their entirety.

U.S. Pat. No. 6,323,307
U.S. Pat. No. 5,216,050
U.S. Pat. No. 4,387,769
U.S. Pat. No. 3,912,692
U.S. Pat. No. 2,703,316

What is claimed is:

1. A method of fracturing a subterranean formation, comprising
  a) injecting a degradable fluid into a subterranean formation, wherein said degradable fluid comprises at least one aliphatic polyester dissolved in a solvent selected from a group consisting of glycerol, propylene glycol, dimethyl sulfoxide (DMSO), and triacetin, and wherein the viscosity of said degradable fluid is between 20 cP and 300 cP;
  b) blocking flow into one or more openings in the subterranean formation with the degradable fluid;
  c) injecting the degradable fluid under pressure into the subterranean formation;
  d) forming at least one fracture in the subterranean formation;
  e) subsequently injecting additional degradable fluid under pressure into the subterranean formation to increase the length and width of the at least one fracture to a predetermined size, wherein the additional degradable fluid does not enter the one or more openings in the subterranean formation;

f) injecting a treatment fluid into the subterranean formation, wherein the treatment fluid comprises the degradable fluid and proppants;

g) placing the proppants in the at least one fracture to prop open the fracture;

h) degrading the degradable fluid in the one or more openings and at least one fracture; and, i) flowing a fluid through the one or more openings and at least one propped fracture.

2. The method of claim 1, wherein the at least one aliphatic polyester is present in an amount of 1 wt. % to 90 wt. % of the degradable fluid.

3. The method of claim 1, wherein the step of degrading the degradable fluid comprises injecting an aqueous fluid to selectively degrade the degradable fluid.

4. The method of claim 1, wherein the at least one aliphatic polyester is selected from a group consisting of poly(lactic acid), polyglycolide, poly(ε-caprolactone), poly(γ-valerolactone), polyhydroxyalkanoate, polyhydroxybutyrate, poly(glycerol adipate), and copolymers thereof.

5. The method of claim 4, wherein said at least one aliphatic polyester is poly(glycerol adipate) and said solvent is propylene glycol.

6. The method of claim 4, wherein said at least one aliphatic polyester is poly(lactic acid) and said solvent is triacetin.

7. The method of claim 1, wherein the step of blocking flow lasts for at least 3 days at a subterranean formation temperature of 120° F. to 140° F.

8. The method of claim 1, wherein the step of blocking flow lasts for at least 1 day at a subterranean formation temperature of 180° F. to 200° F.

9. The method of claim 1, wherein the step of blocking flow restricts 100% of flow through said at least one opening for at least 1 day.

10. The method of claim 1, wherein the treatment fluid comprises a carrier fluid and at least one additive selected from a group comprising salts, pH control additives, surfactants, breakers, biocides, crosslinkers, additional fluid loss control agents, stabilizers, chelating agents, scale inhibitors, gases, mutual solvents, particulates, proppants, corrosion inhibitors, oxidizers, reducers, friction reducer, and any combination thereof.

* * * * *